March 19, 1940.  W. J. FREDERICK  2,193,920
COMPACT, KNOCKLESS, COCKLESS, PIN PISTON
Filed July 12, 1937
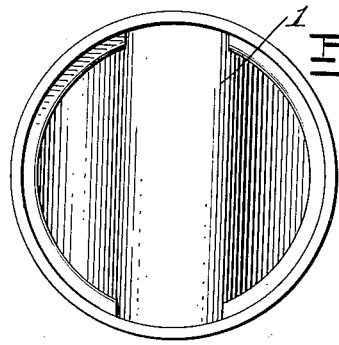
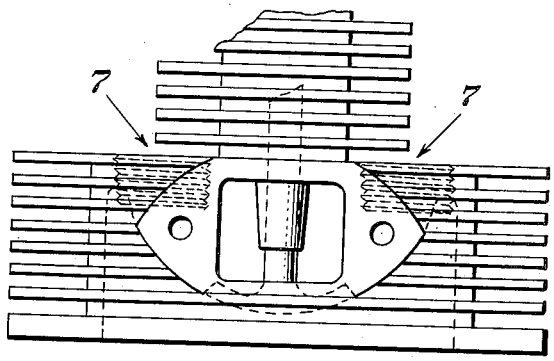
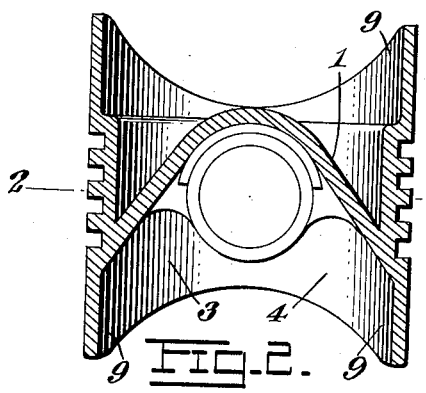
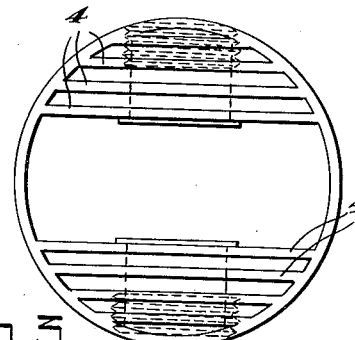
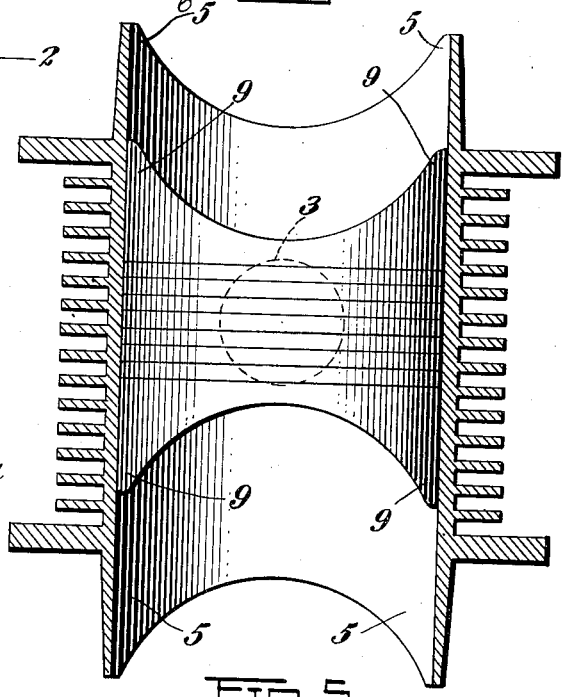
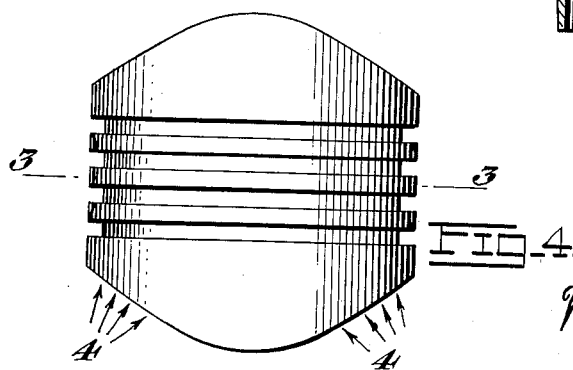
Inventor.
William Joseph Frederick Patented Mar. 19, 1940

2,193,920

UNITED STATES PATENT OFFICE 2,193,920

COMPACT, KNOCKLESS, COCKLESS, PIN PISTON

William Joseph Frederick, Battle Creek, Mich.

Application July 12, 1937, Serial No. 153,134

4 Claims. (Cl. 123—193)

This invention relates to construction of pistons and is directed to correct their mechanical defects, and eliminate the causes of knock and cock and undue wear on rings and other bearing surfaces.

Apparently when pistons were first made for combustion engines, the head was removed at a distance from the pin, in order to remove the heat generated from the pin and other working parts. This was accomplished. However, it was a mechanical error which has given rise to cock, knock, slap, and other difficulties.

In this invention the head is placed adjacent to pin and pin bosses, over same, downward and outward by and away from same, lowering the effective compression head, and causing its plane of effective pressure to contain pin centerline, and divide equally the outer effective bearing area of piston.

With this construction the cock leverage of the piston in the cylinder is reduced to a minimum and balanced, and the circular shape of head over pin has a tendency to direct the pressure toward the pin center.

Also, as the outer effective bearing area of the piston is divided by the plane of effective pressure of the head, there is even wear the entire length of piston.

All parts of the piston are so proportioned as to balance about the pin centerline, thus removing knock caused by unbalanced material, such as heavy head. Knock is also removed with the removing of cock of the piston.

Rings are equally divided and spaced above and below the plane which contains pin centerline, which is at right angles to the longitudinal centerline of the piston. At this location the rings receive the least amount of hammering and abuse, and are therefore longer lived.

In describing one form of this invention in more detail, reference will be had to the accompanying drawing, forming a part of this application, wherein like characters denote corresponding parts in several views, and in which—

Figure 1 illustrates the top view of the head of the piston.

Figure 2 illustrates an end view cross-section.

Figure 3 illustrates the bottom view with the cooling fins on pin bosses.

Figure 4 illustrates a side view on a plane at right angles to the cross-section drawing in Figure 2.

Figure 5 illustrates an end view of piston placed on a cross-section drawing, of an air cooled cylinder-barrel suitable for use with this piston.

Figure 6 illustrates one form of valve in head arrangement suitable for use with this form of piston.

In this drawing 1 designates the combustion-head, 2 designates the plane of effective pressure, and the plane which contains pin centerline, and is at right angles to the longitudinal centerline of piston. These two planes intersect. 3 (in Figures 3, 4, and 5) designates the threaded piston pin insertion plugs, which are inserted in the threaded holes opposite pin ends, and have ring grooves turned thereon on the same circumference as those on piston shell. 4 (in Figures 2, 3, and 4) designates cooling fins. 5 (in Figure 5) designates extended lips on cylinder-barrel such as conform to form of piston shown. 6 (in Figure 6) designates cavities in cylinder-head, which fit piston and lips on cylinder-barrel. 7 (in Figure 6) designates the location of the sparkplug holes at top of cavities on a common centerline midway between valves, and 8 (in Figure 2) designates the thickened portion of piston shell.

In this piston as illustrated a portion of the longitudinal tubular shell is thickened inward in order to receive rings without weakening the piston, and this thickened portion 8 is extended an equal distance above and below a plane (see 2 Figure 2) which contains the centerline which is common to pin and pin bosses, and is at right angles to longitudinal centerline of piston.

The pin bosses extend inward from the thickened portion of shell and have threaded holes at the ends, which communicate with the outside of piston, and have threaded plugs inserted therein upon which ring grooves are turned on the same circumference as those on piston shell.

The head is placed over pin bosses, and downward and outward to sides of piston shell.

Cooling fins 4 are formed on pin bosses and merge into portions of head and shell.

Uniform lips 9 which are longest on the sides midway between pin ends, extend above and below the thickened portion of the shell, so that the above mentioned plane equally divides the outer effective bearing area of the piston. The most effective bearing area is that at the greatest distance from plug ends, and the least effective bearing area is that closest the plugs.

The whole piston is so proportioned as to balance around the pin centerline.

I claim:

1. A piston comprising a longitudinal tubular shell, piston pin bosses integrally joined to said tubular shell, piston pin bearings in said bosses, said bearings having a common centerline which crosses the longitudinal centerline of said tubular shell at right angles, a combustion head within said tubular shell, said combustion head being curved downward over said bosses and joined to the inner circumference of said tubular shell in manner lowering the effective compression point of the upper face of said compression head, cooling fins mounted on said bosses below the compression head, and piston ring grooves on the outer circumference of said piston tubular shell equally grouped above and below a plane through the centerline of said piston pin bearings and perpendicular to the longitudinal centerline of said tubular shell, the parts of said piston being so arranged that in final form, the piston will be balanced about a point exactly coinciding with the point of intersection of the centerline through said piston pin bearings and the longitudinal centerline of said tubular shell.

2. A piston comprising a longitudinal tubular shell, piston pin bosses integrally joined to said tubular shell, piston bearings in said bosses, said bearings having a common centerline which crosses the longitudinal centerline of said tubular shell at right angles, uniformly extending lips on the upper and lower edges of said tubular shell, said lips being longest on the sides of said tubular shell midway between said bearings, a combustion head within said tubular shell, said combustion head being curved downward over said bosses and joined to the inner circumference of said tubular shell in manner lowering the effective compression point of the upper face of said compression head, cooling fins mounted on said bosses below the compression head, and piston ring grooves on the outer circumference of said piston tubular shell equally grouped above and below a plane through the centerline of said piston pin bearings and perpendicular to the longitudinal centerline of said tubular shell, the parts of said piston being so arranged that in final form, the piston will be balanced about a point exactly coinciding with the point of intersection of the centerline through said piston pin bearings and the longitudinal centerline of said tubular shell.

3. In a piston with pin bosses and pin, a longitudinal tubular shell with a portion of the walls thickened inward to receive rings without weakening said piston, said thickened portion extending an equal distance above and below a plane at right angles to longitudinal centerline of piston, and containing the centerline common to pin and pin bosses, said bosses extending inward from the thickened wall portion and having threaded holes at the ends which communicate with the outside of piston, said holes having threaded plugs inserted therein, upon which ring grooves are turned on the same circumference as those on the piston; said ring grooves being equally divided and spaced above and below said plane, a head extending over pin bosses and downward and outward to the sides of said tubular piston shell, lowering the plane of effective pressure, and causing it to intercept the plane containing pin centerline, and equally dividing the outer effective bearing area of the piston consisting of ring area and two uniform lips extending above the thickened portion of said tubular shell, and two below, said lips being longest on sides midway between the insertion plugs, cooling fins on pin bosses that merge into portions of head and shell, and the whole piston so proportioned as to balance around said pin centerline where said pin centerline intersects the longitudinal centerline of the piston.

4. In a piston with pin bosses and pin, a longitudinal tubular shell with a portion of the walls thickened inward to receive rings without weakening said piston, said thickened portion extending an equal distance above and below a plane at right angles to longitudinal centerline of piston, and containing the centerline common to said pin and said pin bosses, said bosses extending inward from thicknened wall portion and have threaded holes at the ends which communicate with the outside of piston, said holes having threaded plugs inserted therein, upon which ring grooves are turned on the same circumference as those on piston, said ring grooves equally divided and spaced above and below said plane, a head extending over said pin bosses and downward and outward to sides of the piston shell, lowering the plane of effective pressure and causing it to intersect the plane containing said pin centerline, and equally divide the outer effective bearing area of piston consisting of ring area, and two uniform lips extending above the thickened portion of said tubular shell, said lips being longest on sides midway between said insertion plugs, the lower and thinner portion of said tubular shell extending sufficiently as a plain piston skirt to counterbalance in weight and effective area said extending upper lips, and the whole piston so proportioned as to balance around said pin centerline, said pin centerline intersecting longitudinal centerline of piston.

WILLIAM JOSEPH FREDERICK.